United States Patent [19]
Hall

[11] Patent Number: 6,115,219
[45] Date of Patent: Sep. 5, 2000

[54] READ WRITE HEAD ASSEMBLY THAT HAS A PAIR OF OPPOSED SLIDERS THAT EACH HAVE A TRANSVERSE SLOTTED RAIL ALIGNED WITH A RAIL IN THE OPPOSING SLIDER THAT DOES NOT HAVE A TRANSVERSE SLOTTED RAIL

[75] Inventor: David L. Hall, Salt Lake City, Utah

[73] Assignee: Iomega Corporation, Roy, Utah

[21] Appl. No.: 09/191,876

[22] Filed: Nov. 13, 1998

[51] Int. Cl.[7] ............................... G11B 5/60; G11B 17/32
[52] U.S. Cl. ..................... 360/234.2; 360/236.9
[58] Field of Search ............................... 360/99.01, 103, 360/234.2, 236.6, 236.9

[56] References Cited

U.S. PATENT DOCUMENTS

| | | | |
|---|---|---|---|
| 3,855,625 | 12/1974 | Garnier et al. | 360/103 |
| 4,414,592 | 11/1983 | Losee et al. | 360/102 |
| 4,419,705 | 12/1983 | Brower et al. | 360/103 |
| 4,646,180 | 2/1987 | Ohtsubo | 360/103 |
| 4,663,682 | 5/1987 | McNeil | 360/105 |
| 4,673,996 | 6/1987 | White | 360/103 |
| 4,757,402 | 7/1988 | Mo | 360/103 |
| 4,814,906 | 3/1989 | Suzuki et al. | 360/103 |
| 4,870,519 | 9/1989 | White | 360/103 |
| 4,901,173 | 2/1990 | Jones et al. | 360/99.04 |
| 4,912,582 | 3/1990 | Gomi et al. | 360/99.01 |
| 4,928,196 | 5/1990 | Hickok | 360/105 |
| 4,974,106 | 11/1990 | White et al. | 360/102 |
| 4,975,794 | 12/1990 | Losee et al | 360/104 |
| 5,086,360 | 2/1992 | Smith et al. | 360/103 |
| 5,184,263 | 2/1993 | Fukakusa et al. | 360/103 |
| 5,189,574 | 2/1993 | Imamura et al. | 360/103 |
| 5,220,470 | 6/1993 | Ananth et al. | 360/103 |
| 5,235,483 | 8/1993 | Hayakawa et al. | 360/103 |
| 5,237,472 | 8/1993 | Morehouse et al. | 360/105 |
| 5,636,085 | 6/1997 | Jones et al. | 360/103 |
| 6,023,393 | 2/2000 | White | 360/103 |

FOREIGN PATENT DOCUMENTS

| | | |
|---|---|---|
| 60-109073 | 6/1985 | Japan . |
| 61-057087 | 3/1986 | Japan . |
| 61-273784 | 12/1986 | Japan . |
| 62-255883 | 10/1988 | Japan . |
| 63-298879 | 12/1988 | Japan . |
| 2-049280 | 2/1990 | Japan . |
| 3-248380 | 11/1991 | Japan . |
| 4-069875 | 3/1992 | Japan . |

OTHER PUBLICATIONS

Chhabra, D.S. et al., et al., "Air Bearing Design Consideratons for Constant Fly Height Applications", *IEEE Trans. Magnetics*, 1994, 30(2), 417–423.

*Primary Examiner*—Jefferson Evans
*Attorney, Agent, or Firm*—Woodcock Washburn Kurtz Mackiewicz & Norris LLP

[57] ABSTRACT

An improved head assembly, that may be disposed on an actuator of a disk drive, includes a pair of sliders for interfacing with a data storage medium of a data storage cartridge. The improved head assembly of this invention includes a first and a second slider that each have a pair of longitudinal rails. These rails preferably extend parallel to the longitudinal axis of the respective slider. The first slider and the second slider each have a slot in one of their longitudinal rails. The sliders are oriented so that the slotted rail of each slider is aligned with an unslotted rail of the other slider. When a storage medium is rotated between the sliders a pressure is created between the storage medium and each of the sliders. Air pressure is bled from the area that is proximal to the slots to create areas of low pressure proximal to the slots. Because of this area of low pressure, the storage medium deflects proximal to the trailing edges of the slotted rail of each slider. Since the head assembly may have a sensor disposed proximal to each slot, the storage medium deflects toward the sensors in the sliders. By deflecting the storage medium toward the sensors, the communicative signal between the head assembly and the data storage medium is enhanced.

22 Claims, 6 Drawing Sheets

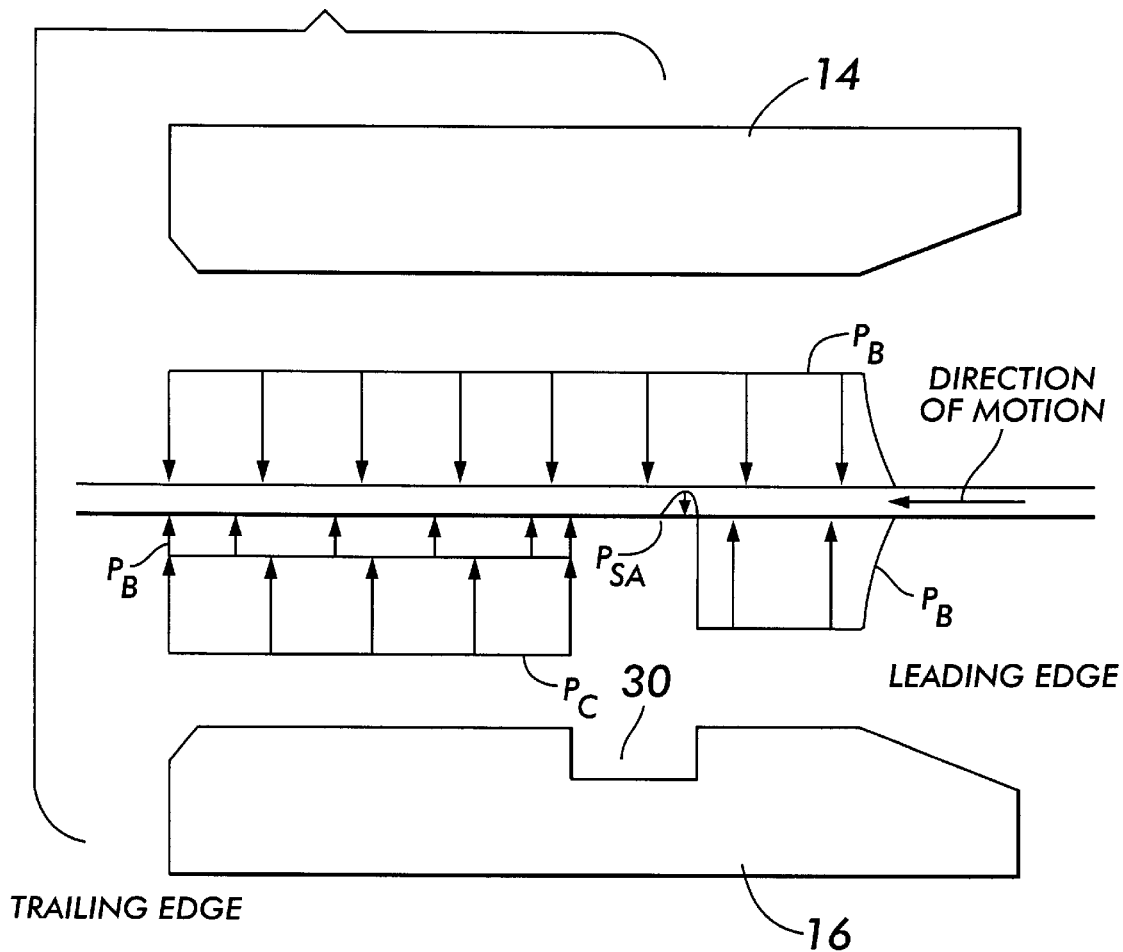

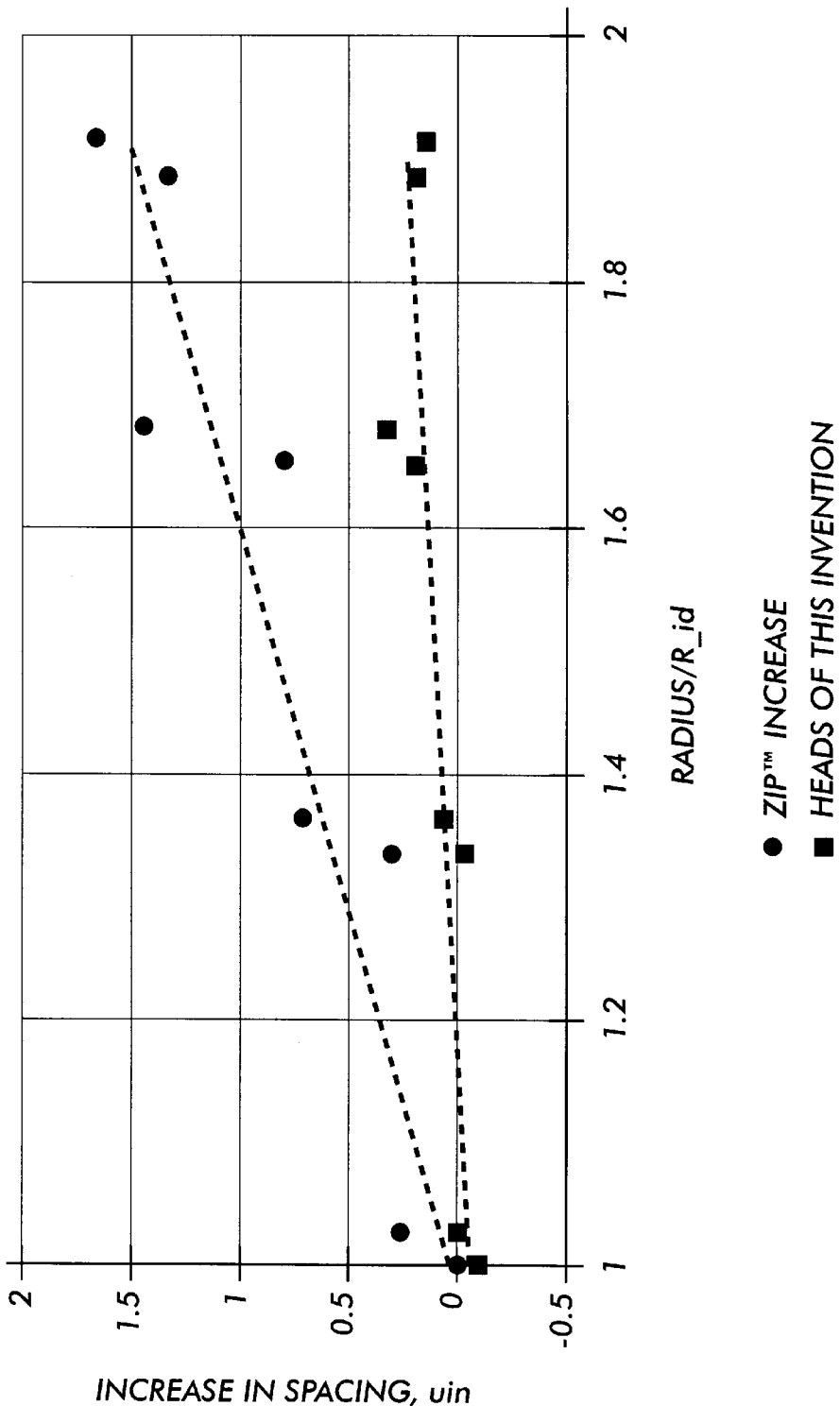

READ WRITE HEAD ASSEMBLY THAT HAS A PAIR OF OPPOSED SLIDERS THAT EACH HAVE A TRANSVERSE SLOTTED RAIL ALIGNED WITH A RAIL IN THE OPPOSING SLIDER THAT DOES NOT HAVE A TRANSVERSE SLOTTED RAIL

BACKGROUND OF THE INVENTION

This invention relates to improved head assemblies for reading/writing data on a storage medium. This invention also relates to actuators and disk drives that employ the improved head assemblies.

Disk drives of the type that receive data storage media typically have a head assembly for communicating with the storage medium. The data storage cartridge may be of the type that is removable from the disk drive. The storage medium may be disc shaped, and if so, the data storage cartridge may be referred to as a disk cartridge. The head assembly may include a pair of sliders. Each slider is typically mounted on an actuator that is mounted within a disk drive. Additionally, each of the sliders may have a read/write head for interfacing with a storage medium of a disk cartridge. The sliders are also commonly referred to as read/write heads.

Generally, the actuator on which the head assembly is mounted moves between a retracted position and an interfacing position. In the retracted position, the heads are disposed in a position that minimizes the likelihood of damage to the heads from either dynamic or static forces. When a disk cartridge has not been inserted into the disk drive, the actuator holds the heads in this retracted position. When a disk cartridge is inserted into the disk drive, the actuator moves the heads to the interfacing position. In the interfacing position, the actuator is in a position in which the heads can interface with the storage medium that has been inserted into the disk drive.

The storage medium with which the head assembly may interface may have a top surface and a bottom surface. Preferably, in the interacting position the storage medium is disposed between the sliders of the head assembly. One of the sliders may be disposed proximal to the top surface, and one of the sliders may be disposed proximal to the bottom surface. In operation, the storage medium of the disk cartridge is rotated between the sliders and an air bearing is created between the storage medium and the sliders. As the storage medium is rotated, the storage medium "rides" on this air bearing and the heads interface with the storage medium.

The design of head assemblies is significant because it effects the ability of the heads to interface with the storage medium of the disk drive. In particular, the ability of the heads to interface with the storage medium is a function of the spacing between the sliders and the storage medium. The spacing between the sliders and the media is important because it effects the ability of the disk drive to communicate with the media. Ordinarily, the sliders fly very low with respect to the media. As the distance between the media and the sliders increases, the signal degrades. With the development of higher density media, it is desired to develop sliders that have even lower fly heights then those previously developed.

For instance, one of the concerns when designing head assemblies is that the spacing between the read/write heads and the storage medium be relatively constant. If the spacing between the read/write heads and the storage medium is not relatively constant, this can cause a degradation in the ability of the heads to interface with the storage medium. The importance of maintaining the spacing between the storage medium and the heads relatively constant is even more pronounced in disk cartridges that have storage mediums with a relatively high density.

In order to maintain an appropriate spacing between the read/write heads and the storage medium, the air bearing created between the slider and the storage medium must be relatively constant. At high speeds, the flexible storage medium tends to flutter and therefore the importance of maintaining the spacing between the read/write heads and the storage medium is even more pronounced at high speeds. In addition to being dependent on the speed of rotation of the storage medium, the air bearing is a function of the geometry of the head assemblies and the storage medium. Therefore, the geometry of these components is of particular importance.

In addition to effecting the performance of the head assembly, the spacing between the head assembly and the storage medium also effects the life of both the read/write heads and the storage medium. For instance, if the storage medium fluctuates, the storage medium and the heads may wear unevenly and their respective lives may be reduced. Furthermore, if the air bearing pressure is relatively high, the storage medium and the heads will wear at a faster rate. The amount of fluctuation of the storage medium is a function of the geometry of the head assembly and the storage medium. Manufacturing imperfections in the design of head assemblies and variations in head assemblies due to large design tolerances have the potential to cause an imbalance of forces between the head assembly and the storage medium and subsequent fluctuations of the storage medium. Therefore, it is important to design head assemblies, so that the manufacturing tolerances are relatively low and the likelihood of manufacturing imperfections are reduced.

Previous designs of magnetic head assemblies are exemplified in U.S. Pat. Nos. 5,636,085 (Jones et al.), entitled "Magnetic Read/Write Head Assembly Configuration With Bleed Slots Passing Through Rails To Stabilize Flexible Medium While Attaining Low Fly Heights With Respect Thereto," and 4,974,106 (White et al.), entitled "Non-Contact Magnetic Head Assembly For A Flexible Medium Disk Drive." Jones et al., which is also owned by the assignee of the invention described in this application, and White et al. both describe magnetic head assemblies. The inventions described in these patents are directed to improved magnetic head assemblies, but may be used with other types of head assemblies such as optical head assemblies.

Recently, higher density storage media has been and is being developed. Previously, the iomega Zip® disk cartridge was considered to have a relatively high density. Even higher density magnetic media are being developed. The sliders and head assembly disclosed in the Jones et al. patent was designed to interface with the magnetic media, such as the Zip® disk cartridge. Although the sliders taught by Jones et al. have been sufficient for use with disk cartridges that have the density about equal to that of the Zip® disk cartridges, the advent of higher density magnetic media requires sliders that can better communicate with higher density media.

The slides, described in Jones et al., have a relatively low fly height. However, this fly height has proven to be insufficient for operation with higher density media. The head assembly of this invention improves upon that of Jones et al. to improve the ability of the disk drive to communicate with higher density media.

This invention includes improved head assemblies for disk drives. This invention also includes disk drives and disk drive actuators that employ the improved or head assemblies of this invention.

SUMMARY OF THE INVENTION

According to this invention, an improved head assembly has a first and a second slider for interfacing with a data storage medium of a data storage cartridge. The second slider is preferably disposed below the first slider. The data storage cartridge with which the head assembly of this invention may be employed may be a disk cartridge of the type that can be inserted and ejected from a disk drive. However, the head assembly of this invention may be employed with other types of data storage cartridges. The head assembly may be a magnetic head assembly and be employed with a magnetic data storage media. However, the head assembly of this invention is not so limited and may be employed with other types of data storage media, such as, optical media. Moreover, the head assembly of this invention may be employed with a variety of types of disk drives, such as, a scanner disk drive, a camera disk drive and a computer disk drive. These examples are not intended to be limiting.

The improved head assembly includes a first and a second slider that each have a pair of longitudinal rails. These rails preferably extend parallel to the longitudinal axis of the respective slider. Both the first and the second sliders have a slot in one of their longitudinal rails. The slot in the longitudinal rail of the sliders may be disposed transverse to the longitudinal axis of the first slider. In an alternative embodiment, the slot extends across one of the longitudinal rails at an angle, other than a right angle, relative to the longitudinal axis of the receptive slider. Preferably, the other longitudinal rail of each slider does not have such a slot. The sliders may be disposed in the disk drive such that the longitudinal rails of each of the sliders are aligned. Preferably the slotted longitudinal rail of each of the sliders is aligned with the longitudinal rail of the other slider that does not have a slot. As described, a storage media may be disposed between the sliders.

Each of the sliders preferably may have a magnetic read/write head disposed on an end of each of its longitudinal rails. The sensor may be disposed in the longitudinal rail of the slider that has the slot. Through this sensor the head assembly can communicate with a microprocessor. In a preferred embodiment, the head assembly is a magnetic head assembly that has an electromagnetic sensor for communicating with a magnetic data storage media.

Each of the sliders preferably has a leading edge and a trailing edge. The leading edge is that which leads the sliders into the direction of rotation of the storage medium, and the trailing edges are that which trail the direction of motion. Preferably, both the leading and the trailing edges of the sliders are beveled. The sensor is preferably disposed proximal to the trailing edge of the sliders.

The head assembly of this invention may be disposed on an actuator within a disk drive. In a preferred embodiment of this invention, the head assembly is disposed on a rotary type of actuator, and in an alternative preferred embodiment the head assembly is disposed on a linear type of actuator. The actuator is preferably moveable between a retracted position and an interfacing position. In the retracted position, the head assembly is retracted relative to the area in which the disk cartridge rests within the disk drive when the disk cartridge is inserted into the disk drive. When a disk cartridge is inserted into the disk drive, the actuator may be moved to the interfacing position. In the interfacing position, the head assembly of the actuator is disposed proximal to the storage medium of the disk drive. More particularly, the storage medium may be disposed between the first and the second slider, so that the first slider is disposed proximal to a first surface of the storage medium and the second slider is disposed proximal to a second surface of the storage medium.

The storage medium is preferably rotated as it rests between the first and the second slider. As the storage medium rotates, pressure is created between the first surface of the storage medium and the first slider and the second surface of the storage medium and the second slider. This pressure creates an air bearing between the first surface of the storage medium and the first slider and the second surface of the storage medium and the second slider.

Because of the slot in the longitudinal rails of the sliders, air is bled from the area that is proximal to the slots between the first surface of the storage medium and the first slider and the second surface of the storage medium and the second slider. By bleeding air from these areas, an area of low pressure is created in the area that is proximal to the slots. In effect, the air bearing is essentially minimized or destroyed by the slots. Because of this area of low pressure, the storage medium deflects towards the slots and the trailing edge of the sliders become disposed closer to the storage medium then the leading edges of the sliders. That is the storage medium is deflected upward toward the slotted longitudinal of the first slider and downward toward the slotted rail of the second slider. Since, as described above, the sensor is disposed proximal to the trailing edge of the slotted rails of the sliders, the storage medium deflects towards the sensor in each slider. The storage medium may even deflect so as to drag or contact the trailing edge of the slotted rail where the sensor is located. By deflecting the storage medium toward the sensors, the performance of the head assembly is enhanced. Other advantages described below may also be achieved by deflecting the storage medium with the slot in the first slider.

In a preferred embodiment, the head assembly is a magnetic head assembly that interfaces with a magnetic data storage media. The head assembly may also be used for optical communication with optical data storage media.

Other features of the invention are described below.

BRIEF DESCRIPTION OF THE DRAWINGS

FIG. 11 is a diagram illustrating the operation of the head assembly of FIG. 1; and FIG. 12 is a graph comparing the operation of the head assembly of this invention with a prior art head assembly.

DETAILED DESCRIPTION OF THE PREFERRED EMBODIMENTS

Figure 1:
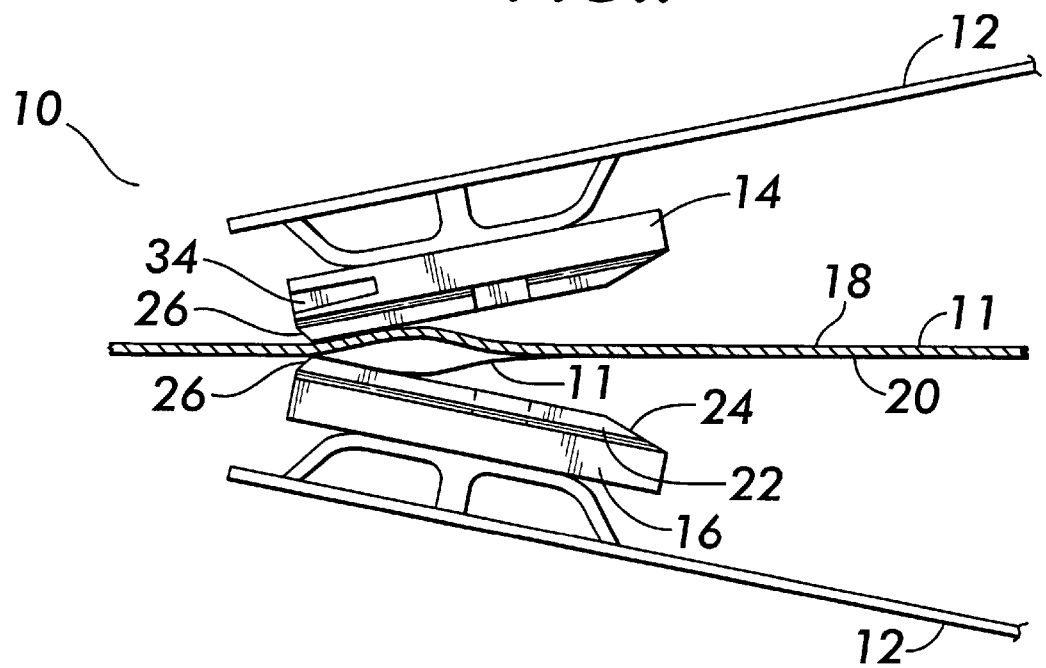
FIG. 1 is a diagrammatical view of the head assembly according to a preferred embodiment of this invention with a storage medium of a disk cartridge.

This invention includes an improved head assembly 10, as shown in FIGS. 1–4, for reading/writing on a data storage medium 11 of a data storage cartridge (not shown). As alluded to above, the improved head assembly 10 of this invention may be used with a variety of types of data storage media, such as magnetic media and optical media. An exemplary data storage cartridge that has a data storage medium 11 is shown in commonly assigned U.S. Pat. No. 5,650,891 entitled "Apparatus For Performing Multiple Functions In A Data Storage Device Using A Single Electro-Mechanical Device," which is hereby incorporated by reference. Even more specifically, the head assembly of this invention may be employed with a magnetic media, such as the Zip® disk cartridge. This invention is directed towards providing enhanced electrical communication with relatively high density media, such as the Zip® disk cartridge or storage media that rotate at higher speeds relative to that of the Iomega Zip® disk cartridge. With the development of media having a density greater than that of the Zip® disk cartridge, improved read/writing devices are needed. The head assembly of this invention also provides improved electrical communication with media having a density that is higher than that of the Zip™ disk cartridge. In the embodiments described below, the head assembly is described as a magnetic head assembly that is employed with magnetic storage media. However, it should be understood that the head assembly of this invention can be employed with other types of media, such as optical media.

In a preferred embodiment, the disk drive with which the head assembly 10 of this invention may be employed may be of one of a variety of types, including but not limited to a stand alone disk drive, a personal computer disk drive, a portable personal computer disk drive, such as in a laptop computer disk drive or a notebook type of computer disk drive, a scanner disk drive, a camera disk drive and a hand held type of computer disk drive. For example, the magnetic head assembly of this invention may be employed with the disk drive described in U.S. Pat. No. 5,650,851.

By way of background, the disk drive with which the head assembly 10 of this invention may be employed may have a disk drive motor for operating the disk cartridge, such as, but not limited to, the one shown in U.S. Pat. No. 5,650,891. In this type of disk drive, the disk drive motor is a spindle motor that is disposed in the chassis of the disk drive. When the disk cartridge is inserted into the disk drive, the disk drive motor engages the hub of the disk cartridge. When engaged with the hub of the disk cartridge, the disk drive motor is operated by a microprocessor to rotate the hub and the attached storage medium 11.

Neither the disk drive nor the disk cartridge described above are part of this invention. However, they may be used in combination with the magnetic head assembly 10 of this invention, which is described in detail below.

The head assembly 10 of this invention may be disposed on an actuator 12 within the disk drive. The actuator 12 depicted in FIG. 1 may a linear type of actuator as disclosed in U.S. Pat. No. 5,650,851. Alternatively, the actuator 12 may be a rotary type of actuator as shown in commonly assigned U.S. Pat. No. 5,636,085, entitled "Magnetic Read/Write Head Assembly Configuration With Bleed Slots Passing Through Rails to Stabilize Flexible Medium While Attaining Low Fly Heights With Respect Thereto," which is hereby incorporated by reference.

The head assembly 10 of this invention may include a first slider 14 and a second slider 16. When the actuator is in the interfacing position described below, the data storage medium 11 may be disposed between the first 14 and the second slider 16, as shown in FIG. 1. In this position, the first slider 14 may be disposed proximal to the first surface 18 of the storage medium 11, and the second slider 16 may be disposed proximal to the second surface 20 of the storage medium 11. As shown, the first slider 14 is disposed above the storage media and the second slider 16 is disposed beneath the storage media. However, the invention is not so limited. The first slider 14 and the second slider 16 must be disposed on opposing sides of the media and they may not be disposed above and below each other depending upon the orientation of the media.

Figure 2:
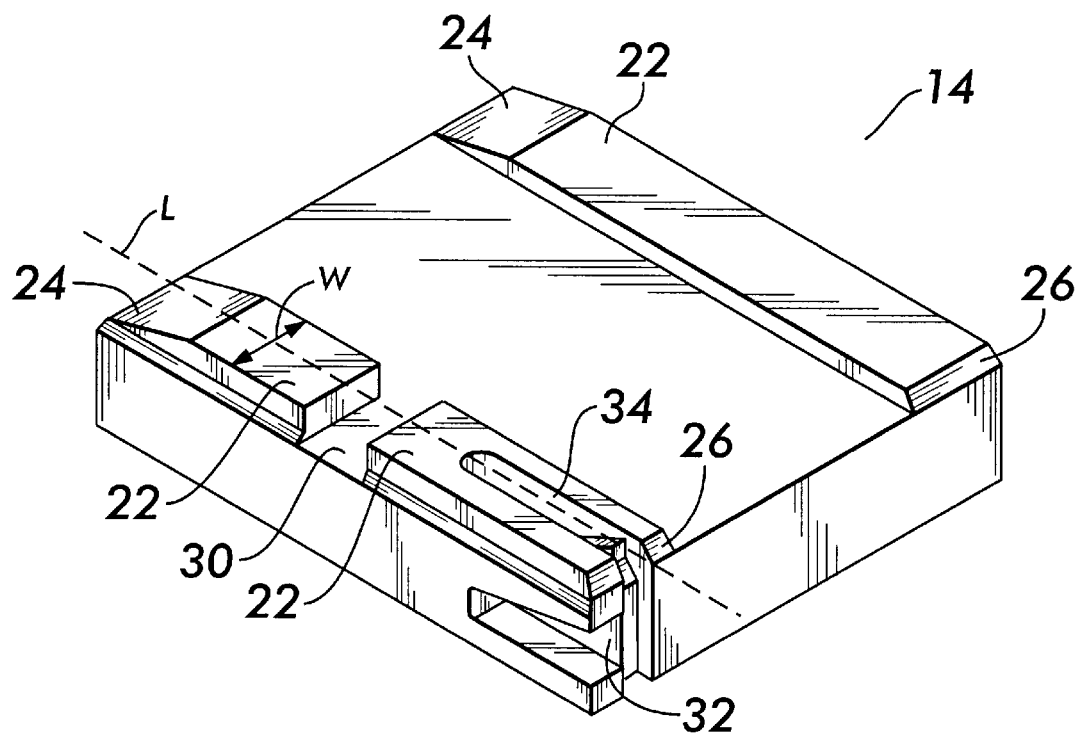
FIG. 2 is an isometric view of a portion of the head assembly of FIG. 1.
Figure 3:
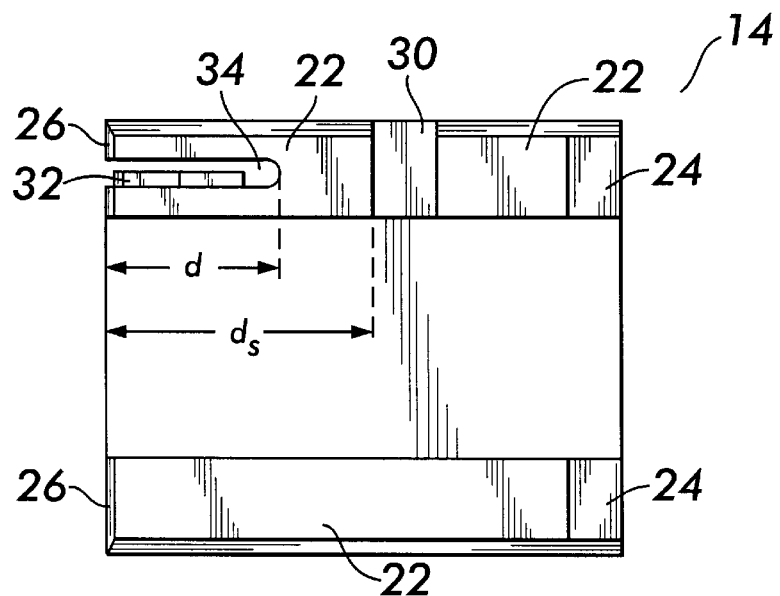
FIG. 3 is a top view of the portion of the head assembly of FIG. 2.

Both the first slider 14 and the second slider 16 have a pair of longitudinal rails 22, as best shown in FIGS. 2 and 3. Although only the first slider 14 is shown in FIGS. 2 and 3, it will be appreciated that the second slider 16 is the same as the first slider 14. The following discussion of the first slider 14 applies to the second slider 16. The longitudinal rails 10 of each of the sliders 14, 16 may extend the length of each of the respective sliders. Each of the rails 20 has a first longitudinal end 24 and a second longitudinal end 26. Preferably, both the first longitudinal end 24 and the second longitudinal end 26 of the rails 22 are beveled. However, they need not be beveled. The first longitudinal end 24 of each of the rails 22 may be the leading edge of the rails 22, and the second longitudinal end 26 of each of the rails 22 may be the trailing edge of each of the rails 22. The trailing edge is that which trails the direction of motion of the slider relative to the storage medium 11, and the leading edge is that which leads the direction of motion of the slider relative to the storage medium 11. Each rail of the first slider 14 and the second slider 16 has a width W that extends transverse to the longitudinal L axis of each of the rails, as shown in FIG. 2.

Figure 4:
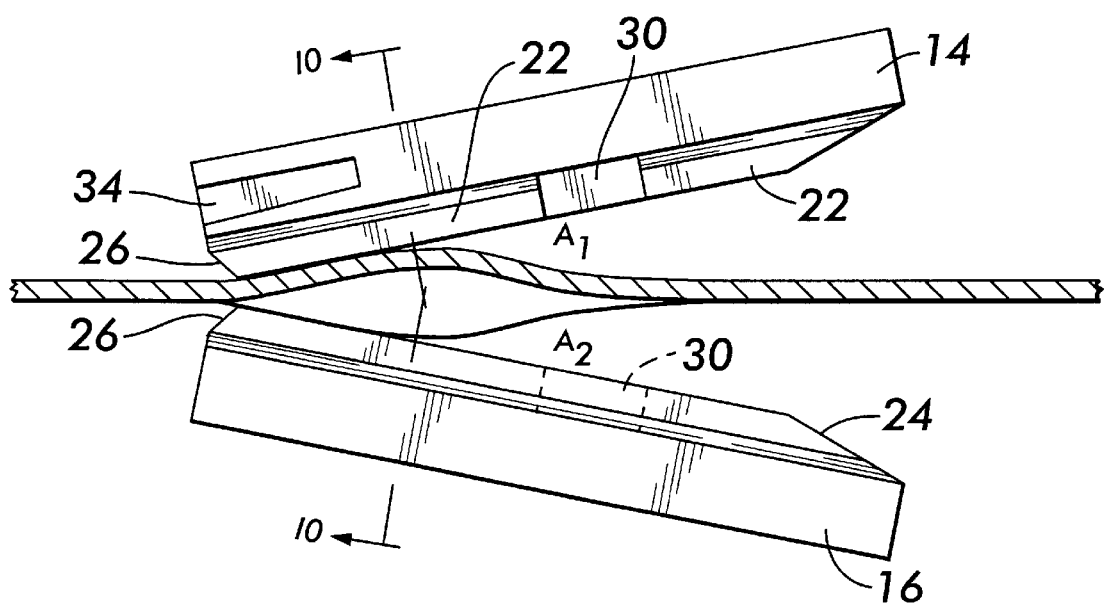
FIG. 4 is a diagrammatical view of the operation of the head assembly of FIG. 1.
Figure 5:
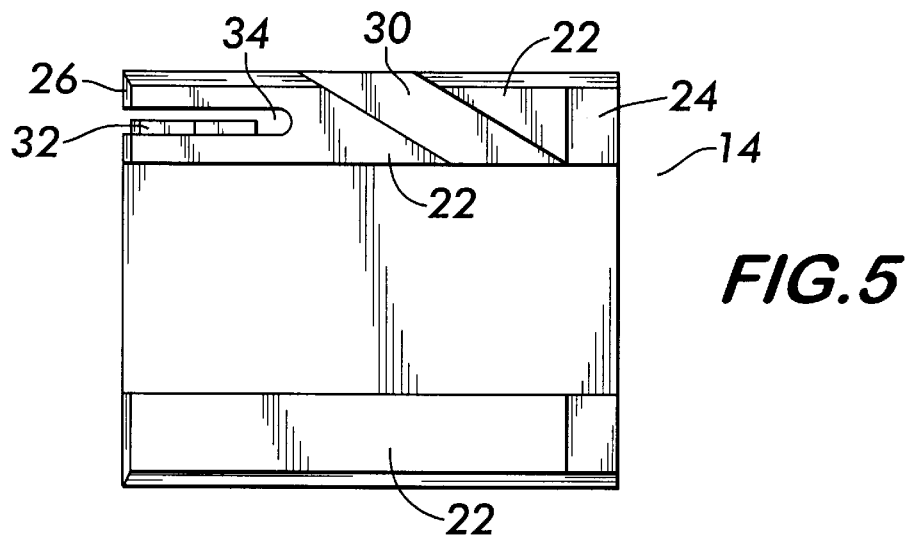
FIG. 5 is a top view of another preferred embodiment of the head assembly of FIG. 1.
Figure 6:
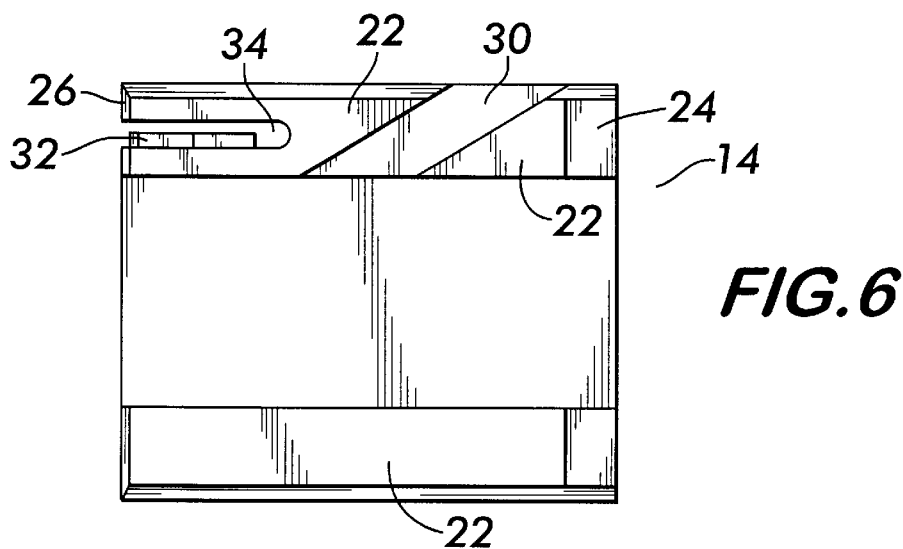
FIG. 6 is a top view of another preferred embodiment of the head assembly of FIG. 1.

Both the first and the second slider 14, 16 of the head assembly 10 have a slot 30 disposed in one of their longitudinal rails 22. When assembled to the actuator as shown in FIG. 1, the first slider 14 is disposed above the second slider 16. Preferably, the sliders are gram-loaded towards each other when assembled to the actuator. The sliders 14, 16 may be assembled to the actuator with any of a variety of fastening techniques and may be mounted to a flexibly mounted suspension arm of the actuator. When mounted to the actuator the slotted rail of the first slider 14 is disposed above the longitudinal rail of the second slider 16 that does not have the slot, as shown in FIGS. 1 and 4. Similarly, the slotted longitudinal rail of the second slider 16 is disposed beneath the longitudinal rail of the first slider 14 that does not have a slot 30. This is also understood with reference to FIG. 2, where it can be imagined that the slider of FIG. 2 is mounted as shown in FIG. 1 as both the first slider 14 and the second slider 16.

Figure 8:
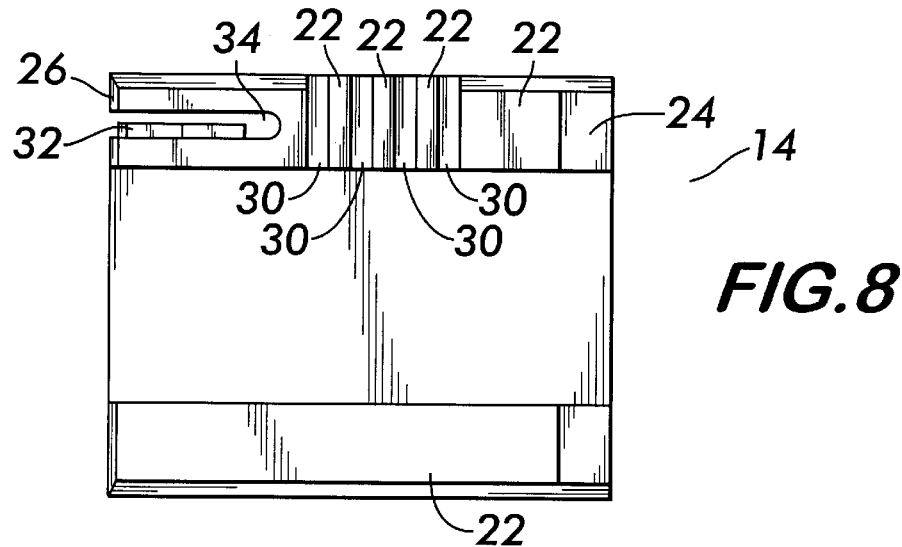
FIG. 8 is a top view of another preferred embodiment of the head assembly of this invention.
Figure 9:
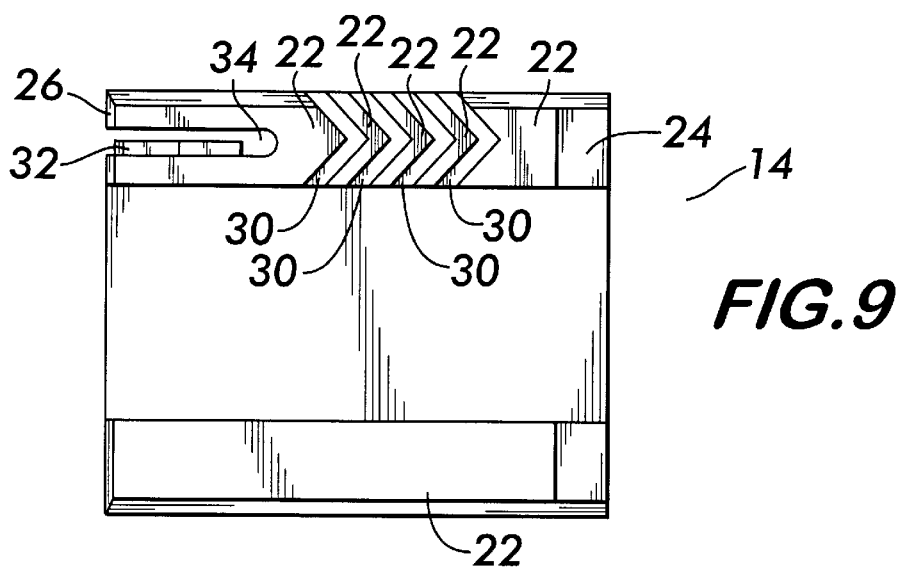
FIG. 9 is a top view of another preferred embodiment of the head assembly of this invention.

Preferably, the slots 30 are disposed transverse to the longitudinal axis L of the rails 22. Even more preferably the slots 30 are disposed across the width W of one of the rails 22. The slot 30 in the first slider 14 is preferably similar to the slot 30 in the second slider 16. The slots 30 may have a variety of shapes and may be disposed at an angle relative to the longitudinal axis of the rails 22, as shown in FIGS. 5, 6, 8 and 9. In each of these embodiments, the slot 30 of the second slider 16 would match the slot 30 of the first slider 14, and the slots 30 are always aligned with a longitudinal rail of the other slider that does not have a slot. The slot may be defined by a series of slots as shown in FIG. 8. As shown in FIG. 9, the slots may be chevron shaped. Any number of slots may be employed, so long as they are transverse to the longitudinal axis of the respective rails. As described in further detail below, one of the functions of this slot 30 is to facilitate the deflection of the storage medium 11 of the disk cartridge.

Figure 7:
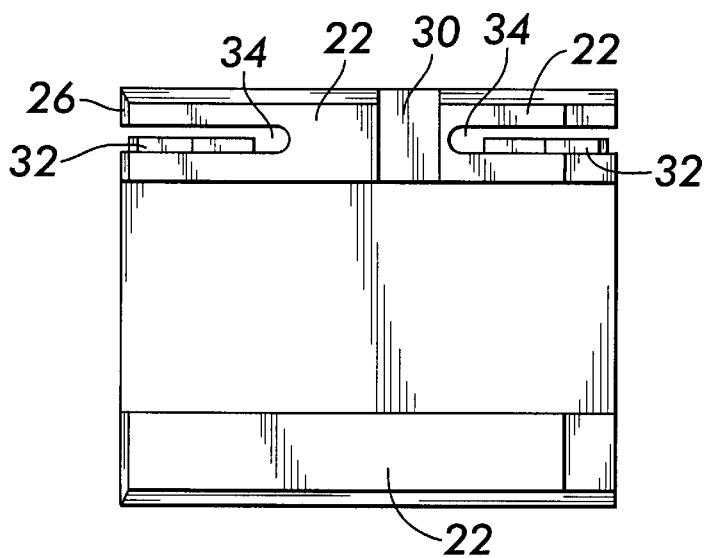
FIG. 7 is a top view of another preferred embodiment of the head assembly of FIG. 1.

Preferably, each of the rails 22 of the sliders 14, 16 has a sensor 32 which includes a groove 34 for receiving a wire (not shown) for electrically communicating with the sliders 14, 16. This wire may be in electrical communication with a microprocessor, so that the storage medium 11 can electrically communicate through the sliders 14, 16 to the microprocessor. Through this wire the respective slider couples the storage media to the microprocessor. The groove 34 may extend longitudinally into one of the rails, as shown in FIGS. 2 and 3. In a preferred embodiment of this invention, the groove 34 is in the rails 22 of the sliders 14, 16 that have the slot 30. Even more preferably, the groove 34 extends longitudinally from the trailing edge 26 of the longitudinal rail 22 that has the slot 30 and extends into the longitudinal rail a distance d that is less than the distance $d_s$ from the trailing edge 26 to the slot 30, as shown in FIG. 3. In an alternative preferred embodiment, the first slider 14 has a groove 34 and a wire in both ends of the longitudinal rail 22 that has the slot 30, as shown in FIG. 7. In this embodiment, one of the grooves and wires provide a high density core and the other provides a low density core. Preferably, the low density core leads the direction of motion and the high density core trails the direction of motion of the media. Similar to the first slider 14, the second slider 16 may also have a groove 34 and a wire and the second slider 16 may have any of these embodiments shown in FIGS. 5–9, so long as that it matches the embodiment of the first slider 14.

Figure 10:
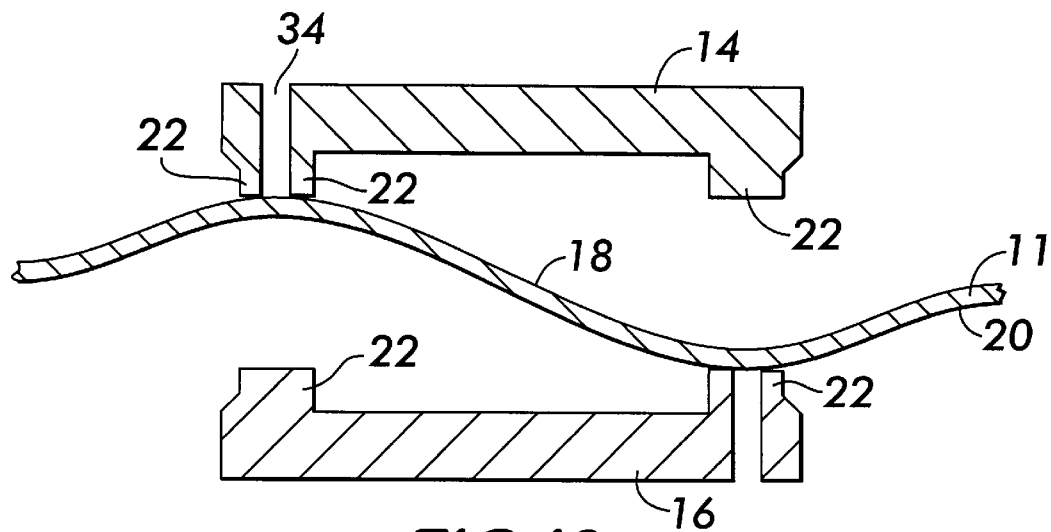
FIG. 10 is a cross section taken along line 10—10 of FIG. 4.

FIGS. 1, 4 and 10 depict the operation of the head assembly 10 of this invention. As shown, in the interfacing position the storage medium 11 of the disk drive is disposed between the first and the second slider 14, 16. The first slider 14 is disposed proximal to the first or top surface 18 of the storage medium, and the second slider 16 is disposed proximal to the second or bottom surface 20 of the storage medium 11. In operation, the storage medium 11 is rotated by a disk drive spindle motor or the like. The direction of rotation of the storage medium 11 is into the leading edges 24 of the sliders 14, 16. While rotating, an air bearing is created in between each of the sliders 14, 16 and the storage medium 11. Because of the slot 30 in one of the rails 22, of each of the sliders 14, 16 some of the pressurized air between the first slider 14 and the storage medium 11 and the second slider 16 and the storage medium bleeds through the slots 30. This creates an area $A_1$ of low pressure, in the region proximal to the slot 30 in the first slider 14 and an area of low pressure $A_2$ in the region that is proximal to the slot in the second slider 16. Because of these areas of low pressure, the storage medium 11 deflects substantially as shown in FIGS. 1, 4 and 10 toward the trailing edges 26 of the slotted rail of each of sliders 14, 16. It will be appreciated that the storage medium deflects upwards towards the slot 30 in the first or upper slider 14 and downward towards the slot 30 in the second or bottom slider 16, as best shown in FIG. 10. This deflection occurs from the slot 30 in the respective slider to the trailing edge of the respective slider. As shown in FIGS. 4 and 9, the storage medium deflects in a ripple or wave shape since it is deflecting both upward and downward.

By deflecting the storage medium 11 towards the trailing edges 26 of the first and the second slider 14, 16, the performance of the head assembly 10 is improved. In particular, since the storage medium 11 deflects towards the sensors 32 in the slotted rails, the performance of the head assembly 10, will be improved.

In a preferred embodiment of this invention, the first and the second slider 14, 16 have the following dimensions. However, these dimensions are provided by way of example and not by way of limitation. These dimensions are for a "nano" slider. However, this invention may be employed with sliders of a variety of sizes, including but not limited to, standard, micro and pico sliders.

Width of sliders=0.060+/−0.01

Length of Sliders=0.076+/−0.004

Width of Rails=0.012 +/−0.004

Length of Slot=0.010 +/−0.005

Thickness=0.018 +/−0.002

With the head assembly of this invention, the media deflects so that the trailing edge of the slotted longitudinal rail of each slider actually touches the media. Since the media is relatively flexible, such as that used in the ZIP® disk cartridge, the media can withstand the contact between the sliders and the media. This contact or closeness between the media and the sensors enhances the electrical communication between the media and the slider. As is generally understood, the voltage or strength of the electrical signal between the slider and the media is dependent upon the spacing between the media and the sensor. The strength of the signal decreases in an exponential relationship with the spacing between the media and the sensor. (This is generally known as the Wallace equation: voltage is proportional to $e^{-\Pi(spacing)/wave\ length}$). Thus, with the media dragging on the rails that have the sensors, the electrical signal is enhanced between the media and the sensor. This is particularly important for magnetic heads that must interface with improved magnetic media that have a relative high density and more storage capacity, for example magnetic media that have more storage capacity that the ZIP® disk cartridge. As described in further detail below, the head assembly of this invention enhances communication with data storage media such as the ZIP® disk cartridge.

This invention is also significant in enhancing communication with media that are rotated at higher velocities. Sliders typically have a "compliance zone" which defines the range of spacing between the media and the slider in which communication is maintained during rotation of the media. When rotating the media at higher velocities, the media has a tendency to move out of the compliance zone and interrupt the communication between the slider and the media. Therefore, the speed of rotation of the media is limited by the compliance zone. It is desired to increase the speed of rotation of the media to increase the data transmission rate between the media and the sensor. This invention permits increased speeds of rotation of the media by providing contact between the media and the head where the sensor is disposed. This contact ensures that the sensor will remain in communication with the media at higher speeds and thereby permit higher data transmission rates.

Magnetic head assemblies, such as that shown in the Jones et al. patent, have transverse slotted longitudinal rails in each slider that are aligned with transverse slotted longitudinal rails in the other slider. Because of this, when the storage media is employed with the head assembly taught by Jones et al., the media will not preferentially deflect towards the sensor in each slider. Rather, because the slots are aligned in Jones et al., an imbalance of forces is not created and the media is not deflected as taught by the head assembly of this invention. As discussed in the Jones et al. patent, the magnetic head assembly taught by Jones et al. provides relatively low fly heights. However, with the development of higher capacity storage media, the fly height taught by Jones et al. is insufficient and does not create the required electrical connection between the media and the sliders. With the invention taught by Jones et al., fly heights on the order of about 2 to 5 micro inches were achieved and acceptable for its intended use. Higher density media require fly heights that are in the range of about 0 to 3 micro inches. The magnetic head assembly of this invention addresses this need and results in even lower fly heights than that taught by Jones et al. and even causes the sliders to drag on the media. This dragging or contact between the media and the slider causes the enhanced communication between the sensor and the media.

White et al. discloses a head assembly that has a slider that has a series of longitudinal slots in a rail aligned with a slider that has an unslotted rail. Because the slots of White et al. are longitudinal, the media will not preferentially deflect towards the sensor as the media does when used with the sliders of this invention. Rather, the media when used with the sliders of White et al. will deflect along the entire length of the rails. This results in more bending of the media and does not achieve the dragging and contact between the sliders and the media that is achieved with this invention. The transverse slots of this invention ensures that the media will deflect toward the sensor and achieve contact between the sensor and the media. It is contact in this area that is desired in order to achieve enhanced communication between the media and the sensor.

In order to manufacture the longitudinal rails of White et al., the width of the rails and the slider must be relatively much wider than the rails of this invention. Because of the increased width of the rails in White et al., the media will have relatively sharp bends when it is disposed between the sliders in the area that is between the rails. These sharp bends are more difficult to impose on the media, and therefore the media does not respond and deflect as much as it could because it resists bending to form the sharp bends. The transverse slots of this invention do not require as great a width of the rail and therefore, do not result in these relatively sharp bends in the media. Thus, the bending of the media is more easily achieved with this invention.

In order to further understand the operation of this invention, a schematic force diagram is provided in FIG. 11. FIG. 11 illustrates the operation of the media with the transverse slot in the second slider 16. Although the media 11 is shown non-deflected in FIG. 8 for purposes of explaining the invention, it should be understood that the media deflects as shown in FIGS. 1, 4 and 10 in operation. It should be understood that the media will react similarly to the slot in the first slider 14, except that the pressures will be reversed in direction, so as to correspond to the surfaces of the rails. As is generally understood, the sliders are preloaded or gram-loaded towards the magnetic media. This gram loading causes a biasing towards the media. The rotation of the storage media combined with this gram loading creates an air bearing between the storage media and the sliders. A contact pressure is also created as the media rotates and contacts the slider.

As shown in FIG. 8, the air bearing pressure $P_B$ on each side of the media sharply increases as the media is disposed between the beveled leading edges 24 of the rails 22. The beveled edges create this sharp increase. Since the rails 22 are similar until the slot is reached, the media will not deflect or deflect insignificantly in the Z direction as the media travels between the rails until the slot 30 is reached. Upon reaching the slot 30, the air pressure from the slotted portion of the rail becomes sub-ambient $P_{SA}$ and then essentially zero. Because the rail of the top slider does not have a slot, it still imposes an air bearing pressure downward onto the media. This unmatched downward pressure accelerates the media downward towards the slot 30. When the slot ends, air pressure is again exerted by the rail in the lower slider, but at a lesser magnitude than the air pressure exerted by the upper rail. Because the media contacts, the second or bottom slider a contact pressure $P_C$ is exerted upward on the media. This contact pressure combines with the air pressure $P_B$ exerted by the lower slider to overcome the air pressure exerted by the top slider and cause the media to deflect back upward towards its level plane. As the media exits the slider, the media again is level because the pressures are removed. The slotted rail in the first or top slider 14 operates similarly.

In summary, since the transverse slot in each rail is not aligned with a slotted rail, the air bearing on the surface of the media near the slotted rail is disrupted or destroyed. This imparts momentum to the media to deflect towards the rail with the slot and closer to the sensor. This also causes lower flying heights and contact between the media and the slider where it is desired, at the location of the sensor. This enhances the electrical signal between the media and the slider and enables higher density media to be used.

When the media is spun, the media wrinkles and vibrates. The surface of the media does not remain flat because it is a flexible media. By deflecting the media toward the sensor and creating a contact pressure between the media and the sensor, the media is flattened proximal to the sensor. This enhances the communication between the media and the sensor. This should be compared to the heads taught by Jones et al. which provides no preference for deflecting the media towards the sensor.

The head assembly of this invention can also be employed with optical media and optical sensors such as near field optical sensors and far-field optical sensors.

The operation of the head assembly can also be understood with reference to FIG. 12. FIG. 12 is a graphical representation of the performance of the heads used in a ZIP® disk drive with the heads of this invention. The graph depicts the results of tests performed on these heads. The vertical axis is the increased spacing or distance between the media and the slider where the sensor is disposed as the sliders move from the center of the media. The horizontal axis is a ratio of the radius of the location of the sensor on the media to the radius from the center of the media to the inner most track on the media. The diamond points represent the spacing between the heads of Jones et al. or the ZIP® disk drive at various points along the media, and the squares represent the data points obtained with the heads of this invention.

As shown, as one moves to the right on the page or toward the outer part of the disk, the spacing between the sensor and the media increases. This degrades the communication between the media and the sensor and limits the speed of rotation of the media, which limits the data transmission rate. In comparison, the heads of this invention result in a relatively constant spacing. This permits increased rotation of the media and increased data transmission rates.

In summary, the improved head assembly 10 of this invention includes a first and a second slider 14, 16. Both of these sliders 14, 16 have a pair of longitudinal rails 22, and a slot 30 disposed in one of the longitudinal rails 22. Preferably, the sensor 32 is disposed in the slotted longitudinal rails 22, and even more preferably the sensors 32 are disposed proximal to the trailing edge 26 of each slotted longitudinal rail 22. The storage medium 11 of a disk cartridge may be disposed between the first and the second sliders 14, 16. While rotating between the first and the second sliders 14, 16, an air bearing is created between the surfaces 18, 20 of the storage medium 11 and the respective slider 14, 16. Air bleeds from the slots 30 in the rails 22. This causes the pressure on the respective surface of the media that is proximal to the slots 30, to be less than the pressure on the opposing side of the media. Because of the reduced pressure, storage medium 11 deflects toward the slots 30 and the sensors, as shown in FIGS. 4 and 10 in a wave pattern. This enhances the performance of the head assembly 10, and potentially has the other advantages described above.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

I claim:

1. A head assembly for interfacing with a storage medium of a disk cartridge, comprising:
   a first slider, comprising:
      (i) a first rail, extending longitudinally along the first slider, and having a slot that extends across an entire width of the first rail;
      (ii) a second rail, extending longitudinally along the first slider, and not having any slots extending across a width of the second rail;
      (iii) a sensor disposed in a trailing end of the first rail of the first slider for communicating with the disk cartridge; and
   a second slider aligned with the first slider, comprising:
      (i) a first rail, extending longitudinally along the second slider and having a slot that extends across an entire width of the first rail of the second slider; the first rail of the second slider being aligned with the second rail of the first slider;
      (ii) a second rail, extending longitudinally along the second slider, and having no slots extending across a width of the second rail of the second slider, the second rail of the second slider being aligned with the first rail of the first slider;
      (iii) a sensor disposed in a trailing edge of the first rail of the second slider for communicating with the disk cartridge; and
   wherein the storage medium deflects towards the slots in the first rails when the storage medium is rotated between the first and the second slider to thereby place the storage medium proximal to the sensors in each slider and enhance the communicative signal between the storage medium and the first and the second sliders.

2. The head assembly of claim 1, wherein the first slider further comprises a groove in which the sensor of the first slider is mounted.

3. The head assembly of claim 1, wherein each of the rails of the first and the second sliders comprises a beveled leading edge.

4. The head assembly of claim 1, wherein the head assembly comprises a magnetic head assembly and the sensors comprises electromagnetic sensors for communication with magnetic storage medium.

5. The head assembly of claim 1, wherein the slots of the first rails extend transverse to a longitudinal axis of the respective first rails.

6. The head assembly of claim 1, wherein the slots of the first rails are chevron shaped.

7. The head assembly of claim 1, wherein the slots of the first rails extend in an angular relationship with a longitudinal axis of the respective rail in which the slot is disposed.

8. The head assembly of claim 1, wherein the slots of the first rails comprise a series of slots.

9. The head assembly of claim 8, wherein each of the series of slots comprise chevron shaped slots.

10. The head assembly of claim 8, wherein each of the series of slots comprise slots that extend in an angular relationship with a longitudinal axis of the respective rail in which the slot is disposed.

11. A disk drive for receiving a disk cartridge that has a storage medium that has a first surface and a second surface, comprising:
   an actuator for communicating with the cartridge;
   a head assembly mounted on the actuator, comprising:
      a first slider, comprising:
         (i) a first rail, extending longitudinally along the first slider, and having a slot that extends across an entire width of the first rail;
         (ii) a second rail, extending longitudinally along the first slider, and not having any slots extending across a width of the second rail;
         (iii) a sensor disposed in a trailing edge of the first rail of the first slider; and
      a second slider that is aligned with the first slider, comprising
         (i) a first rail, extending longitudinally along the second slider and having a slot that extends across an entire width of the first rail of the second slider; the slot of the first rail of the second slider being aligned with the second rail of the first slider;
         (ii) a second rail, extending longitudinally along the second slider, and having no slots extending across a width of the second rail of the second slider, the second rail of the second slider being aligned with the first rail of the first slider;
         (iii) a sensor disposed in a trailing edge of the first rail of the second slider; and
      wherein the storage medium is inserted so that the first surface is proximal to the first slider and the second surface is proximal to the second slider, the storage medium deflecting towards the slots in the first rails when the storage medium is rotated between the first and the second slider to thereby place the storage medium proximal to the sensors and enhance the communicative signal between the medium and the first and the second sliders.

12. The disk drive of claim 11, wherein the first slider further comprises a groove in which the sensor of the first slider is mounted.

13. The disk drive of claim 11, wherein each of the rails of the first and the second sliders comprises a beveled leading edge.

14. The disk drive of claim 11, wherein the head assembly comprises a magnetic head assembly and the sensors comprises electromagnetic sensors for communication with magnetic storage medium.

15. The disk drive of claim 11, wherein the slots of the first rails extend transverse to a longitudinal axis of the respective first rails.

16. The disk drive of claim 11, wherein the slots of the first rails are chevron shaped.

17. The disk drive of claim 11, wherein the slots of the first rails extend in an angular relationship with a longitudinal axis of the respective rail in which the slot is disposed.

18. The disk drive of claim 11, wherein the slots of the first rails comprise a series of slots.

19. The disk drive of claim 18, wherein each of the series of slots comprise chevron shaped slots.

20. The disk drive of claim 18, wherein each of the series of slots comprise slots that extend in an angular relationship with a longitudinal axis of the respective rail in which the slot is disposed.

21. A disk drive that has an improved magnetic head assembly for interfacing with a removable magnetic disk cartridge that has a magnetic media and a spindle motor for rotating the magnetic media when the disk cartridge is inserted into the disk drive, comprising:

a first slider that has a transverse slotted longitudinal rail, the slot extending across an entire width of the slotted rail and a longitudinal rail that does not have a slot and a sensor disposed in a trailing edge of the slotted longitudinal rail for interfacing with the magnetic media;

a second slider that has a transverse slotted longitudinal rail, the slot extending across an entire width of the slotted rail and a longitudinal rail that does not have a slot and a sensor disposed in a trailing edge of the slotted longitudinal rail for interfacing with the magnetic media; and an actuator on which the first slider and the second slider are mounted, the first slider being disposed above the second slider, the sliders being aligned so that the slotted longitudinal rail of each slider is aligned with the longitudinal rail of the other slider that does not have a slot; the magnetic media being disposed between the sliders when inserted into the disk drive and when rotated by the spindle motor the magnetic media deflecting towards the slotted longitudinal rail of each slider and the sensor disposed in each slider to thereby enhance the interface between the sensors and the magnetic media.

22. The disk drive of claim 21, wherein the slots are chevron shaped.

* * * * *